United States Patent
Rainer

(10) Patent No.: US 12,374,218 B2
(45) Date of Patent: Jul. 29, 2025

(54) METHOD FOR COOPERATIVE RESOURCE ALLOCATION FOR PERFORMING MOVEMENT MANEUVERS IN A ROAD AREA, AND RELATED CONTROL CIRCUIT AND MOTOR VEHICLE HAVING SUCH A CONTROL CIRCUIT

(71) Applicant: AUDI AG, Ingolstadt (DE)

(72) Inventor: Julia Rainer, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 368 days.

(21) Appl. No.: 18/001,419

(22) PCT Filed: May 3, 2021

(86) PCT No.: PCT/EP2021/061502
§ 371 (c)(1),
(2) Date: Dec. 9, 2022

(87) PCT Pub. No.: WO2021/249695
PCT Pub. Date: Dec. 16, 2021

(65) Prior Publication Data
US 2023/0222902 A1    Jul. 13, 2023

(30) Foreign Application Priority Data
Jun. 10, 2020  (DE) ............... 10 2020 115 432.1

(51) Int. Cl.
*G08G 1/01*  (2006.01)
*G08G 1/0967*  (2006.01)
*H04L 9/00*  (2022.01)

(52) U.S. Cl.
CPC ..... *G08G 1/0145* (2013.01); *G08G 1/096725* (2013.01); *G08G 1/096766* (2013.01); *H04L 9/50* (2022.05); *H04L 2209/84* (2013.01)

(58) Field of Classification Search
CPC .......... G08G 1/0145; G08G 1/096725; G08G 1/096766; G08G 1/096716;
(Continued)

(56) References Cited

U.S. PATENT DOCUMENTS 10,783,600 B2   9/2020 Zachary
2020/0341490 A1* 10/2020 Silva .............. H04W 4/024
(Continued)

FOREIGN PATENT DOCUMENTS

CN   108492550 A   9/2018
CN   108961047 A   12/2018
(Continued)

OTHER PUBLICATIONS

International Preliminary Report on Patentability directed to International Patent Application No. PCT/EP2021/061502, issued Oct. 13, 2021; 21 pages.
(Continued)

*Primary Examiner* — Peter D Nolan
*Assistant Examiner* — Demetra R Smith-Stewart
(74) *Attorney, Agent, or Firm* — Sterne, Kessler, Goldstein & Fox P.L.L.C.

(57) ABSTRACT

The present disclosure relates to a method for which a road area is divided into multiple resources and a storage device for reservation data for exclusively reserving the respective resource is provided that is made available to each road user. A control circuit of a respective road user plans a respective movement route over at least one of the resources on the basis of reservation data currently stored in the storage device and takes the planned movement route as a basis for reserving the resources required therefor by generating its own reservation data in the storage device.

8 Claims, 3 Drawing Sheets

(58) Field of Classification Search
CPC . G08G 1/096791; H04L 9/50; H04L 2209/84; H04L 9/3239
See application file for complete search history.

(56) References Cited

U.S. PATENT DOCUMENTS

| | | | |
|---|---|---|---|
| 2021/0027557 A1* | 1/2021 | Margaria, Jr. | G07C 5/0841 |
| 2021/0232989 A1* | 7/2021 | Rana | G05B 19/418 |
| 2022/0067570 A1* | 3/2022 | Kong | G06N 20/00 |

FOREIGN PATENT DOCUMENTS

| | | |
|---|---|---|
| EP | 3 316 657 A1 | 5/2018 |
| EP | 3 386 142 A1 | 10/2018 |
| EP | 3525157 A1 | 8/2019 |
| EP | 3525158 A1 | 8/2019 |
| KR | 20190010195 A | 1/2019 |
| WO | WO 2019/154968 A1 | 8/2019 |

OTHER PUBLICATIONS

International Search Report of the International Searching Authority directed to related International Patent Application No. PCT/EP2021/061502, mailed Jul. 6, 2021, with attached English-language translation; 6 pages.
Lei Zhang et al., "Blockchain based secure data sharing system for Internet of vehicles: A position paper", Vehicular Communications, Band 16, Apr. 1, 2019 (Apr. 1, 2019), pp. 85-93, XP055600646 ISSN 2214-2096.

* cited by examiner

METHOD FOR COOPERATIVE RESOURCE ALLOCATION FOR PERFORMING MOVEMENT MANEUVERS IN A ROAD AREA, AND RELATED CONTROL CIRCUIT AND MOTOR VEHICLE HAVING SUCH A CONTROL CIRCUIT

TECHNICAL FIELD

The present disclosure relates to methods for cooperative resource allocation for executing movement maneuvers of road users in at least one predetermined road area. Such a road area can for example be a crossroads, over which the road users wish to pass. The road area is divided into multiple resources, which only one of the road users is respectively allowed to occupy at the moment. A control device, by means of which a road user can participate in the method, also belongs to the present disclosure. Finally, the present disclosure provides a motor vehicle with such a control device.

BACKGROUND

Application cases for the so-called direct V2X communication, thus for an ad-hoc radio network, which can be formed by road users in mutual radio range without base stations, have to be able to cover complex situations with multiple road users. Nowadays, this is only effected for individual traffic mechanisms, such as the so-called "do not pass warning DNPW" or "emergency vehicle warning".

However, in order that networked and automated drive functions can be implemented, as many traffic scenarios as possible have to be covered. To this day, there are only fragmentary approaches to safely and efficiently coordinate motor vehicles via ad-hoc radio networks like V2V/V2P/V2I, such as through various crossroads. An example is the "intersection movement assist", where the on-board application of the OBU (on-board unit) of a motor vehicle calculates the probability of collision. A further existing possibility of safely guiding road users through crossroads via V2X, arises via V2I, where an RSU (road-side unit) functions as a manager and "virtual traffic lights". However, new infrastructure always has to be constructed at each crossroads thereby, because the motor vehicles cannot be coordinated without a controlling unit.

From CN 108 492 550 A, a method for a self-organizing V2X high-speed motor vehicle fleet based on a blockchain technology is known. The method assigns motor vehicles in a preset environment to a temporary motor vehicle fleet and coordinates the travel thereof by means of V2X communication based on the blockchain technology to inexpensively and efficiently configure a fleet travel.

From EP 3 316 657 A1, a method and a device for motor vehicle management in a vehicle network are known. The method captures status information from motor vehicles in a network, in particular V2V network, and manages them in that one of the motor vehicles is deployed as a leading vehicle to release, based on a division of radio channel resources on the part of the leading vehicle, them for further ones of the motor vehicles.

From EP 3 386 142 A1, it is known how a commonly usable storage device can be provided by means of a blockchain.

From WO 2019/154968 A1, a method for assigning road sections to autonomously driving road users is known, in which a market simulation performs the assignment of the road sections. The road users negotiate among each other or with a center, which assigns the road sections, about the use of individual road sections and pay with tokens from a virtual wallet, which contains a limited number of tokens, according to their preference. Therein, that road user gets assigned the road section that is ready to pay the highest price.

By the prior art, a possibility is not provided that road users can coordinate or reconcile their movement maneuvers in a road area with each other without central guidance system.

BRIEF DESCRIPTION OF DRAWINGS

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

In the drawings, like reference numbers generally indicate identical or similar elements. Additionally, generally, the left-most digit(s) of a reference number identifies the drawing in which the reference number first appears.

DETAILED DESCRIPTION

Figure 1:
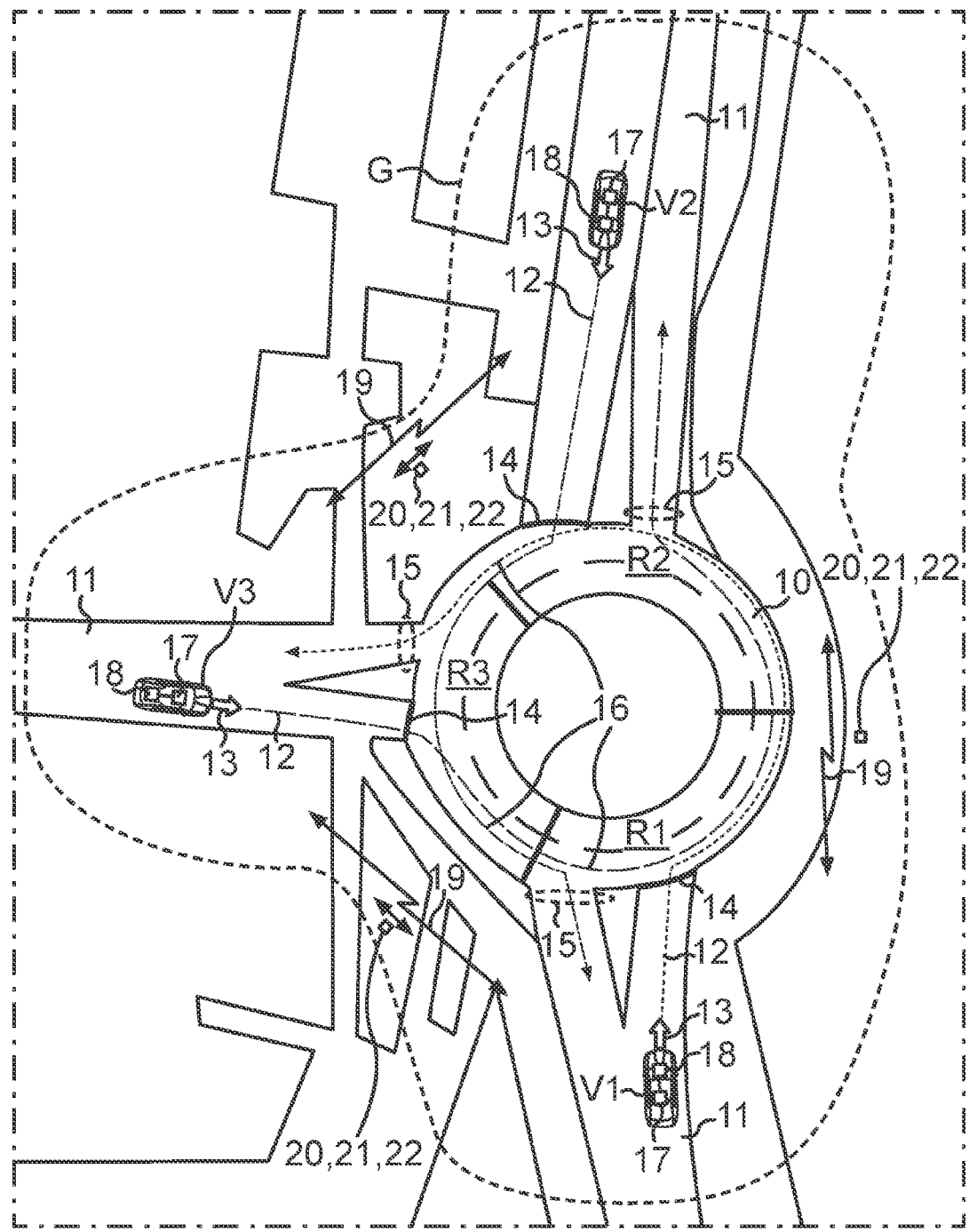
FIG. 1 depicts a schematic representation of the motor vehicle in a first traffic scenario, according to some embodiments.

The present disclosure is based on the object to coordinate or reconcile road users with each other in order that they can perform movement maneuvers matched with each other in this road area.

The object is solved by the subject matters of the independent claims. Advantageous embodiments of the present disclosure are described by the dependent claims, the following description as well as the figures.

A method is provided by the present disclosure to cooperatively allocate or assign resources for executing movement maneuvers in at least one predetermined road area. For example, a partial surface in the road area can be managed as the respective resource, such that the resources overall result in the road area. Herein, "cooperative" means that the involved road users mutually agree upon the assignment of the resources without a central or superordinate assigning authority for the resources being required.

Hereto, the road area is divided into multiple resources by a predetermined division specification, thus for example multiple partial surfaces, and a storage device for reservation data for exclusively reserving the respective resource is provided, which is made available to each road user located in a predetermined region including the road area. Thus, each road user that wishes to use, thus wishes to traverse or generally wishes to pass (e.g. in the case of a pedestrian), the road area, can access the storage device to recognize based on the reservation data, which resources are already allocated or reserved and which resources are still available.

A control circuit of a respective road user that approaches the road area and/or is located in the road area and in which a required entry location into the road area and a required exit location from the road area are known by a preset travel way, plans a movement route from the entry location to the exit location over at least one or some of the resources depending on the reservation data currently stored in the storage device. The travel way of the road user can for example be described by navigation data, which indicates that a travel route from the current position over the road area or through the road area leads to a travel destination. The entry location (entrance) and the exit location (exit) also result from it. Then, the road user reserves itself the resources required hereto according to the planned movement route by generating own reservation data in the storage device. By means of initiating movement maneuvers, the at least one resource of the road area is then successively occupied by the road user according to the reservation data. In case of an autonomous drive function of a motor vehicle, initiating movement maneuvers can for example be in that a trajectory planner of an autopilot obtains control signals to form the trajectory of the autonomous drive function according to the planned movement routes. In case of a human driver or a pedestrian, it can be provided that the initiation of movement maneuvers is in that the driver or pedestrian obtains outputs (for example verbal and/or graphic and/or haptic) maneuvering instructions. A movement maneuver can for example include traversing a lane and/or turning and/or a lane change to name just examples.

In other words, the road user uses the resources of the road area according to the reservation data registered by him or it in the storage device such that he or it can be sure that the allocation of the resources is known to the other road users via the reservation data stored in the storage device and these road users will not interfere with his or its movement maneuver. With a road user in the form of a motor vehicle, the reservation can for example be performed by a control circuit of a control unit or a combination of control units. A road user in the form of a pedestrian or cyclist can for example carry such a control circuit as an operating device, for example as a smartphone or a smartwatch.

By an embodiment, the advantage arises that it is known to each road user how he or it has to behave in order to behave in coordinated manner with each other road user in the road area such that the planning of the movement routes of all of the road users in the road area is coordinated or interleaved hereby without a superordinate management unit, for example the initially described RSU, having to be installed for the road area hereto. The other road users do not have to be directly known such that they do not have to be directly identifiable, which is advantageous for reasons of data protection law. They can sign in or register themselves as a "unit" in the storage device, but do not have to be marked with their features and are thereby identifiable via the registered period of time, e.g. as "vehicle No. 305", but not recognizable via their external features such as vehicle model and color or number plate.

According to an embodiment, a data structure is provided as the common storage device, which is kept synchronized (identical in content) via an ad-hoc radio network between the road users in the region. Thus, the synchronization ensures that the data structure becomes identical in content at the road users kept synchronous. Hereto, road users can emit copies of their locally stored data structure to respectively a different road user via the ad-hoc radio network. In particular, an ad-hoc radio network can be realized by the so-called V2X communication (V2X-vehicle to everything) or the V2V communication (V2V-vehicle to vehicle). It can be based on a 5G mobile radio technology and/or a Wi-Fi technology.

In order ensure herein that the road users recognize, which is the most current version of the data structure, e.g. if more than one version of the data structure is present at a road user (for example because an own data structure was created and a data structure was received from another road user), in an embodiment, the data structure includes a blockchain, in which the reservation data is attached by the control circuit of the respective road user as a respective new data block. By means of a blockchain, the data structure can be adapted in known manner at the road users to the effect even in case that two road users register reservation data in their local copy of the data structure at the same time and then emit it to the remaining road users. Hereto, the matching process known for blockchains from the prior art can be used.

Since a blockchain mechanism can demand very much storage and computing power, it cannot be requested from an on-board computer of a motor vehicle that a database of all of the networked vehicles is maintained. Therefore, the idea of this system of the blockchain can be used, but only in a local transmission perimeter. Since the perimeter of a vehicle is not the same intersecting set as that of a vehicle 200 m onwards, a single continuous blockchain would not be possible. However, there is the possibility of creating a blockchain, which only "locally" exists. If vehicles are located in this area, they are affected by it. As soon as the vehicles are outside of the area, they do no longer consider the blockchain message, and after they exit the transmission range of the involved vehicles, they either do no longer receive this message. Since V2V messages (message data 20) only go as far as the signal strength allows, this blockchain is thereby automatically only applied in the area/region G. This area, where this blockchain is applied, is of course most useful if such autonomous communication entails most advantages. Thus, they are all possible situations, where vehicle paths cross each other. The present disclosure also includes embodiments, by which additional advantages arise.

In an embodiment, one of the following is provided as a respective road area: a crossroads, a roundabout, an entry, an exit. In such a road area, multiple roads or driveways join and a coordination of the merging road traffic is required. Now, this can occur without expensive installation of additional RSUs.

In an embodiment, the movement maneuver is a travel of an autonomously driving motor vehicle. In other words, it is assumed that motor vehicles with autonomous drive function coordinate with each other by means of the method. The advantage arises that these motor vehicles can reconcile or coordinate their behavior or their movement maneuvers (drive maneuvers) in the road area with each other without additional devices external to vehicle. An autonomously driving motor vehicle is in particular a motor vehicle with the degree of automation level 3 and above according to the standard SAE J3016.

In an embodiment, such a road user that approaches the road area alone, in case that the road area is empty, respectively dynamically generates the storage device. In other words, whenever the road area has been temporarily used by no road user and thus an ad-hoc radio network and a storage device, for example a blockchain, are not present, a version of the storage device is automatically initialized or generated as needed by the first road user that uses or approaches the road area after such a period of time, and in case that a further road user approaches, this storage device is then communicated or provided to him or it e.g. via an ad-hoc radio network.

In an embodiment, the respective reservation data indicates the resource to be reserved and an allocation period of time for the resource. In other words, the reservation for a resource is effected limited in time, i.e. the allocation period of time defines a start point of time and an end point of time for the allocation by the respective road user that registers the reservation data. The advantage arises that two road users can also coordinate in time and thus perform drive maneuvers one after the other in time in the same resource and can plan or reconcile it.

In an embodiment, in at least one of the road users, the reservation data is determined for the entire movement route upon approaching the road area. In other words, already in advance for the time from the entry into the road area, it is determined for the road user how he or it has to behave in the road area with respect to whereabouts and respective point of time (preset movement trajectories, which determine movement path and timing).

In an embodiment, in at least one of the road users, the reservation data is dynamically registered in the storage device in multiple steps, while the respective road user is in the road area. Hereby, replanning or dynamic adaptation is advantageously possible, whereby it can be reacted to events such as for example a traffic accident or a breakdown of another road user.

In an embodiment, the reservation data is changed and/or supplemented for rebooking at least one resource by at least one of the road users, while the respective road user is in the road area. In other words, a road user can voluntarily change the planned allocation of resources and any remaining road user can react thereto. Hereby, in case that a new event forces the road user to modify the planning of its movement route, a coordination with every remaining road user can nevertheless be achieved.

In an embodiment, a digital road map is taken as a basis as the division specification, in which the resources for a road network are defined. In other words, the division specification is given by map data of a digital road map. In this map data, a division into resources can each be performed to one or more road areas. This map data can be obtained or downloaded by each road user for example from at least one server device (for example a server of the Internet or a computer cloud). An alternative form of the division specification can for example provide a dynamic division by one or more road users. Additionally or alternatively thereto, it is provided according to further embodiments that swarm data points are indicated, by which the resources have been identified (thus e.g. have been directly measured by multiple motor vehicles as possible resources and reported to a server), and/or that geographic sections according to a GNSS data format (GNSS-Global Navigation Satellite System, e.g. the GPS-Global Positioning System) are indicated, which e.g. define the boundaries of the resources.

In an embodiment, a partial surface of the road area is preset as the respective resource. In other words, such a resource includes a partial area, which constitutes a portion of the road area. Hereby, road users can thus coordinate with respect to their spatial relative position to each other. Therein, the partial surfaces taken together preferably result in the entire area of the road area. Herein, the division into at least three or at least four or at least five resources (partial surfaces) is in particular provided.

In an embodiment, a portion of an overall sound level admissible in the road area is additionally or alternatively preset as the respective resource. In other words, the road users can agree to the effect that an arising sound level of a traffic noise does not exceed the overall sound level by their common use of the road area, but remains less or equal to the overall sound level.

In an embodiment, a portion of a maximum emission admissible in the road area is additionally or alternatively preset as the respective resource. In other words, the road users can coordinate to the effect that an emission emitted by them remains less or equal to the value of the maximum emission, while road users use the road area. Such an emission can for example relate to carbon dioxide and/or nitrogen oxide.

By the present disclosure, a control circuit for a road user is provided according to an aspect, wherein the control circuit is configured to perform the steps of an embodiment of the method relating to a road user, according to the present disclosure. For a motor vehicle, such a control circuit can for example be realized in the described form as a control unit or as a combination of multiple control units. A control circuit for a road user that participates in the road traffic in the road area as a pedestrian or cyclist can for example be realized by a smartphone or a smartwatch or a tablet PC. However, a control circuit can also be realized in a motor vehicle in the same manner for example by a smartphone. The control circuit can comprise a data processing device or a processor device, which is configured to perform an embodiment of the method according to the present disclosure. Hereto, the processor device can comprise at least one microprocessor and/or at least one microcontroller and/or at least one FPGA (Field Programmable Gate Array) and/or at least one DSP (Digital Signal Processor). Furthermore, the processor device can comprise program code, which is configured to perform the embodiment of the method according to the present disclosure upon execution by the processor device. The program code can be stored in a data storage of the processor device.

By the present disclosure, a motor vehicle with the control circuit according to the present disclosure is provided according to an embodiment. The motor vehicle according to the present disclosure is preferably configured as a car, in particular as a passenger car or truck, or as a passenger bus or motorcycle.

The present disclosure also includes realizations, which each comprise a combination of the features of multiple of the described embodiments, as far as these embodiments have not expressly been denoted as alternatives.

Figure 2:
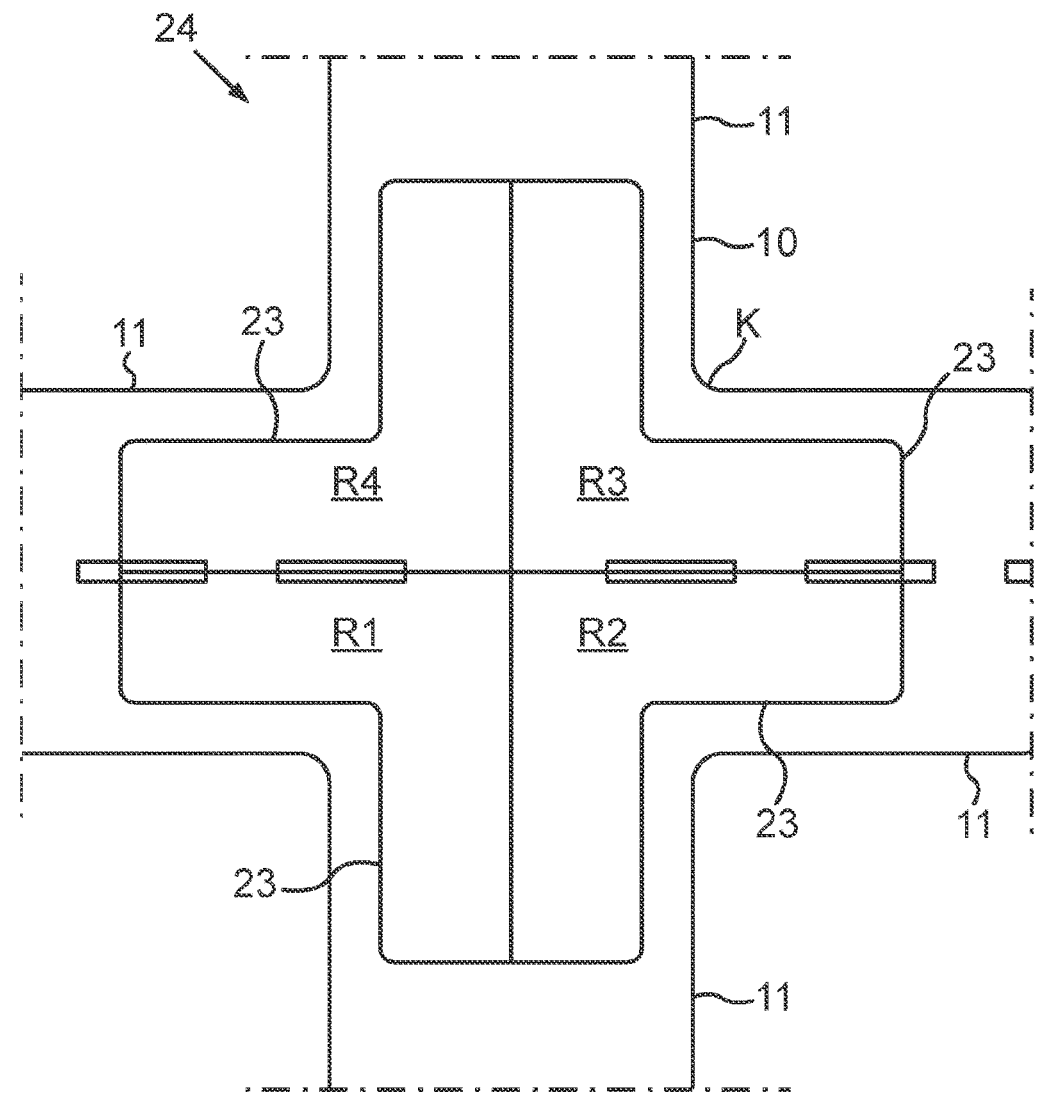
FIG. 2 depicts an outline for illustrating a possible division specification, according to some embodiments.

In the following, embodiments of the present disclosure are described. Hereto, there shows:

FIG. 1 is a schematic representation of embodiments of the motor vehicle according to the present disclosure in a first traffic scenario;

FIG. 2 is an outline for illustrating a possible division specification; and

Figure 3:
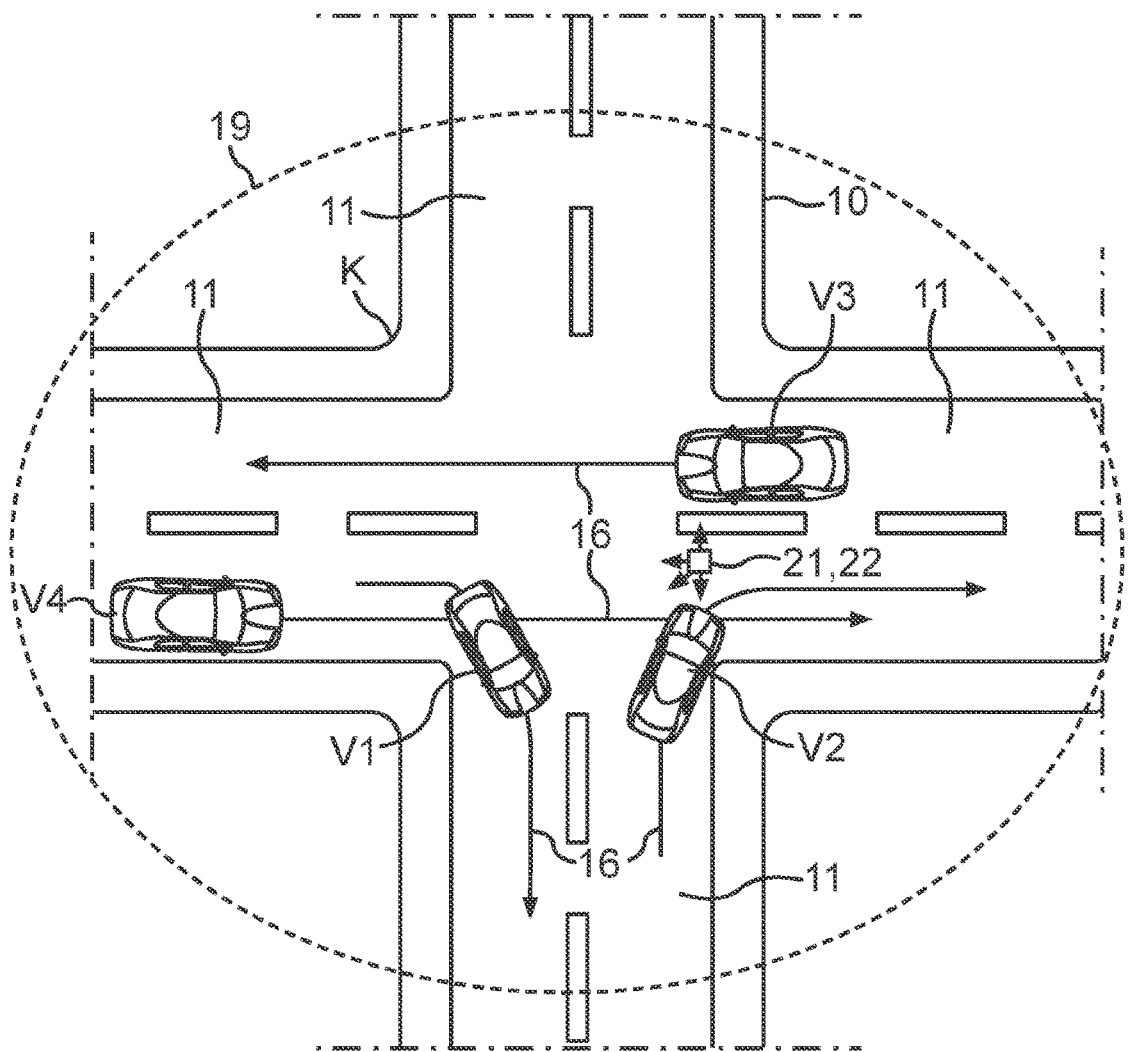
FIG. 3 depicts a schematic representation of the motor vehicle in a second traffic scenario, in which the division can be used, according to some embodiments.

FIG. 3 is a schematic representation of embodiments of the motor vehicle according to the present disclosure in a second traffic scenario, in which the division specification according to FIG. 2 can be used.

The embodiments explained in the following are preferred embodiments of the present disclosure. In the embodiments, the described components of the embodiments each represent individual features of the present disclosure to be considered independently of each other, which also each develop the present disclosure independently of each other. Therefore, the disclosure is to include also combinations of the features of the embodiments different from the illustrated ones. Furthermore, the described embodiments can also be supplemented by further ones of the already described features of the present disclosure.

In the figures, identical reference characters each denote functionally identical elements.

FIG. 1 shows a road area 10, which can be a roundabout, via which multiple roads 11 are connected to each other. Road users V1, V2, V3 can drive on the roads 11 that each have planned a travel way 12, which leads them through the road area 10. In the example, it is to be assumed that the road users V1, V2, V3 arrive at the road area 10 close to each other in time such that a coordination of their movement maneuvers 13, thus for example traveling on or generally passing the road area 10, has to be coordinated with each other. Therein, an entry location 14 and an exit location 15 relating to the road area 10 arises for each road user V1, V2, V3 by the respective travel way 12. An entry location 14 can for example each be an entrance and/or an exit location 15 can for example each be an exit. Therein, the travel way 12 should extend on movement routes 16 within the road area 10, which allow traveling on the road area 10 without collision.

In order to ascertain these movement routes 16, each motor vehicle V1, V2, V3 can each carry a control circuit 17, which can for example be realized by a control unit or a combination of multiple control units or by a smartphone or a smartwatch or a tablet PC to name just examples for possible control circuits.

By the respective control circuit 17, movement maneuvers 13 of the respective road user V1, V2, V3 along the movement route 16 can each be initiated or caused, wherein the movement routes 16 are matched with each other such that the road users can pass the road area 10 without mutual interference and/or danger.

Hereto, the control circuit 17 can each be coupled to a communication device 18 in the respective road users V1, V2, V3, by which the road users V1, V2, V3 or generally the control circuits 17 can form an ad-hoc radio network 19 with each other, via which the control circuits 17 can exchange message data 20 of messages. By the message data 20, a commonly maintained storage device 21 in the road users V1, V2, V3 can be kept synchronous or identical in content. By transmission ranges of the communication devices 18, a region G overall arises, within which all of the road users V1, V2, V3 located therein with control circuit 17 can keep the storage device 21 synchronous. If there is temporarily no road user in the region G and if a road user then enters the region G, thus, he or it can newly set or initialize the storage device 21 as the first one. As the communication device 18, for example a mobile radio module or a Wi-Fi radio module can be provided. For example, the ad-hoc radio network 19 can be based on V2X and/or V2V communication.

The road users V1, V2, V3 can exchange reservation data 22 via the storage device 21. The reservation data 22 can relate to resources R1, R2, R3 of the road area 10. In FIG. 1, it is represented how partial surfaces or lanes or lane sections of the road area 10 can be provided as the resources R1, R2, R3. The division of the road area 10 into the resources R1, R2, R3 can for example be effected by map data of a road map of the roads 11 and of the road area 10. Thereby, this road map represents a division specification, with or by which the road users V1, V2, V3 have to comply or orient themselves when they designate or indicate a resource R1, R2, R3 in the reservation data 22. The reservation data 22 can indicate for a respective resource R1, R2, R3 that a specific road user V1, V2, V3 wishes to occupy this resource R1, R2, R3 for a predetermined period of time. The remaining road users V1, V2, V3 are then informed via the common storage device 21 when one of the road users V1, V2, V3 will be located in the resource R1, R2, R3.

The storage device can be a data structure for example in the form of a blockchain. A road user can attach his or its own reservation data 22 as a respective data block to this blockchain and then emit the updated blockchain as an updated storage device 21 as a part of the message data 20 to the remaining road users V1, V2, V3. If two or more road users V1, V2, V3 update and emit their locally stored storage device 21 at the same time, thus, by means of a logic known per se for matching storage data or storage contents, such as is for example known form blockchains in the prior art, it can be ensured that all of the road users V1, V2, V3 have present the same data content of the storage device 21 in their control circuit 17.

For example, the following traffic scenario can arise for three vehicles in a roundabout, i.e. the road users V1, V2, V3 can be motor vehicles or briefly vehicles and the road area 10 can be a roundabout in the said manner. Herein, the following is to be assumed: vehicle V1 wants towards V3, thus needs resources in the order: R1, R2, R3; vehicle V2 wants towards V1, thus needs resources in the order: R2, R3, R1; vehicle V3 wants towards V2, thus needs resources in the order: R3, R1, R2.

Overall, a time matrix or resource matrix can arise for the road users V1, V2, V3, which can be the content of the storage device 21 and in which the reservation data for individual time slots provides an association of road user V1, V2, V3 with the respective resource R1, R2, R3, which is illustrated in the manner that each row is associated with a road user V1, V2, V3 and each column in the matrix represents a time slot, the beginning and end point of time of which are known to each road user (e.g. 10 second time slots): time matrix/resource matrix with reservation data 22:

$$\begin{pmatrix} V1 \\ V2 \\ V3 \end{pmatrix} \rightarrow \begin{pmatrix} 0 & 0 & R_1 & R_2 & R_3 & \\ 0 & R_2 & R_3 & R_1 & 0 & ... \\ 0 & 0 & 0 & R_3 & R_1 & \end{pmatrix}$$

According to the reservation data 22, the vehicle V2 enters the roundabout at an earlier point of time/slot and needs the resource of V3 at the point of time of entry of V3, therefore, the vehicle V3 has to wait. However, since V2 is subsequently in the resource R2, the driver of V3 would not know when he can enter, since V1 potentially traverses the whole roundabout and drives to his origin. With the blockchain, the waiting process is not present, i.e. an automated drive function can continue his movement route 16.

Thus, in order that the vehicles can follow a simple mechanism "among themselves", where each one is considered and each one can efficiently and safely follow its route, a blockchain mechanism is used. By the information already contained in the blockchain, all of the involved vehicles know that some certain resources have been blocked by a vehicle and which are free, thus can register themselves for free resources. In this case, resources are sections of roads. All of the vehicles, which are located in the perimeter, get the blockchain message via a V2X message (message data 20). By preset rules of the blockchain, all of the road users know how they have to behave and how they can block resources. With these rules, the new vehicles block and describe a new block of the blockchain and the subsequent vehicles receive this information and thereupon in turn known which resources they can use. Anyone who does not comply with the rules of the blockchain, thereby only endangers himself, therefore, it is in the own interest to observe the rules. This consensus mechanism functions according to the system "risk of life".

This mechanism functions for all of the possible traffic scenarios, where vehicle routes cross each other, therein, the rules of the blockchain have to be known to the road users for the certain crossroads situation.

A mechanism for traffic flow increase, reduction of accidents and general implementation for safe networked driving in all possible crossroads situations arises. The mechanism functions without control unit, which makes decisions for the participants, but the decision is collaboratively made.

FIG. 2 and FIG. 3 illustrate a further traffic scenario.

Herein, FIG. 2 illustrates a crossroads K as a road area 10, at which 4 roads 11 join. A possible division of the crossroads K into partial surfaces 23, of which each represents a resource R1, R2, R3, R4, is illustrated in FIG. 2. This division can be preset by a division specification 24, which can for example be a constituent of map data of a digital road map in the described manner.

FIG. 3 illustrates how road users V1, V2, V3, V4 can coordinate their movement routes 16 in time and location in the crossroads K by means of the division specification 24 via an ad-hoc radio network 19. The road users V1, V2, V3, V4 can for example exchange a blockchain as the commonly maintained storage device 21 via the ad-hoc radio network 19 in the described manner, in which reservation data 22 can be stored.

For the traffic scenario illustrated in FIG. 3, the following assumptions can exemplarily apply: the road users V1, V2, V3, V4 can be motor vehicles or briefly vehicles and the road area 10 can be a crossroads K in the said manner, and therein vehicle V1 needs the resource R1 according to the travel way planned by it; vehicle V2 wishes to turn right, needs resource R2; vehicle V3 wishes to drive straight ahead, needs resources in the order: R3, R4; vehicle V4 wishes to drive straight ahead, needs resources in the order: R1, R2. The following time matrix/resource matrix results from it:

$$\begin{pmatrix} V1 \\ V2 \\ V3 \\ V4 \end{pmatrix} \rightarrow \begin{pmatrix} 0 & R_1 & R_1 & 0 & 0 \\ 0 & R_2 & R_2 & 0 & 0 \\ 0 & R_3 & R_4 & 0 & 0 \\ 0 & 0 & 0 & R_1 & R_2 \end{pmatrix}$$

According to this reservation data 22, the vehicle V4 enters the crossroads at a later point of time, while the three other vehicles execute their maneuvers. By the blockchain of the storage device 21, the control circuit 17 knows for the driver/for the automated drive function of V4 that it can simply execute its movement maneuver and none of the vehicles in the crossroads will cross the path/need a resource at the same time as it, i.e. the traffic remains fluent.

Since a blockchain mechanism can demand very much storage and computing power, it cannot be requested from an on-board computer of a motor vehicle that a database of all of the networked vehicles is maintained. Therefore, the idea of this system of the blockchain can be used, but only in a local transmission perimeter. Since the perimeter of a vehicle is not the same intersecting set as that of a vehicle 200 m onwards, a single continuous blockchain would not be possible. However, there is the possibility of creating a blockchain, which only "locally" exists.

If vehicles are in this area, they are affected thereby. As soon as the vehicles are outside of the area, they do no longer consider the blockchain message, and after they exit the transmission range of the involved vehicles, they either do no longer receive this message. Since V2V messages (message data 20) only go as far as the signal strength allows, this blockchain is thereby automatically only applied in the area/region G. This area, where this blockchain is applied, is of course most useful if such autonomous communication entails most advantages. Thus, they are all possible situations, where vehicle paths cross each other.

However, this mechanism can also be able to be extended to other road users, such as pedestrians, cyclists and motorcycles, as long as they have an appliance, which similarly processes the V2X messages.

The idea can be implemented with available technology. The local blockchain (generally storage device 21) respectively only relates to one crossroads point. Therefore, e.g. two crossroads on a road, which are 500 m apart, each preferably have an own local blockchain. Vehicles, which traverse the first crossroads, thus, participate in the blockchain of the first crossroads. After they have traversed it, they ignore these messages, receive the message of the second crossroads with a second blockchain, which complies with other rules, and participate in this blockchain to traverse the second crossroads.

Overall, the examples show how a cooperative resource allocation can be provided for executing drive maneuvers.

The invention claimed is:

1. A method for cooperative resource allocation for executing movement maneuvers in a road area, the method comprising:
dividing the road area into one or more resources based on a predetermined division specification, wherein a storage device is used for reservation data for exclusively reserving the one or more resources;
providing the one or more resources to a control circuit of a road user as the road user approaches the road area and/or is located in the road area, wherein a required entry location into the road area and a required exit location from the road area are known by a preset travel way;
planning, by the control circuit, a movement route from the required entry location to the required exit location using the one or more resources based on the reservation data currently stored in the storage device;
reserving, by the road user, the one or more resources required by generating and storing the reservation data in the storage device according to the planned movement route;
occupying, by the road user, the one or more resources of the road area one after another in time according to the reservation data by means of initiation of the movement maneuvers, and
executing, by the control circuit, the movement maneuvers of the road user along the movement route, wherein the road user and another road user pass the road area without mutual interference based on the movement route,
wherein a data structure is used in the storage device, the data structure being kept synchronized between the road user and the other road user in the road area via an ad-hoc radio network formed by the control circuit,
wherein if the road user approaches the road area alone, and the road area is empty, the data structure is dynamically generated and stored in the storage device, wherein the data structure includes a blockchain, in which the reservation data is attached as a new data block by the control circuit of the road user, and wherein the blockchain is automatically applied only in the road area when the road user is located in the road area, such that the other road user no longer considers a blockchain message as soon as the other road user is outside of the road area, and after the other road user exits a transmission range of involved vehicles and thereby no longer receives the blockchain message.

2. The method according to claim 1, wherein the reservation data indicates the one or more resources to be reserved and an allocation period of time for the one or more resources.

3. The method according to claim 1, wherein for the road user, the reservation data is determined for the movement route upon approaching the road area.

4. The method according to claim 1, wherein for the road user, the reservation data is dynamically registered in the storage device in one or more steps, while the road user is located in the road area.

5. The method according to claim 1, wherein for the road user, the reservation data is changed and/or supplemented for rebooking the one or more resources, while the road user is located in the road area.

6. The method according to claim 1, wherein the predetermined division specification comprises at least one of: a digital road map used as a basis, in which the one or more resources for a road network are defined, or swarm data points are indicated, by which the one or more resources are identified, or geographic sections according to a global navigation satellite system (GNSS) data format are indicated.

7. The method according to claim 1, wherein a partial surface of the road area is preset as the one or more resources.

8. The method according to claim 1, wherein a portion of an overall sound level admissible in the road area is preset as the one or more resources.

* * * * *